(12) United States Patent
Lee et al.

(10) Patent No.: US 8,302,350 B2
(45) Date of Patent: Nov. 6, 2012

(54) FIXING STRUCTURE OF OPENING WEATHER STRIP FOR VEHICLE

(75) Inventors: Jong Hae Lee, Hwaseong-si (KR); Young Min Ahn, Hwaseong-si (KR)

(73) Assignee: Kia Motors Corporations, Seoul (KR)

( * ) Notice: Subject to any disclaimer, the term of this patent is extended or adjusted under 35 U.S.C. 154(b) by 0 days.

(21) Appl. No.: 12/870,169

(22) Filed: Aug. 27, 2010

(65) Prior Publication Data

US 2011/0296763 A1    Dec. 8, 2011

(30) Foreign Application Priority Data

Jun. 8, 2010   (KR) .................. 10-2010-0054010

(51) Int. Cl.
*B60J 1/02* (2006.01)
(52) U.S. Cl. .................. 49/475.1; 49/440; 49/495.1
(58) Field of Classification Search .................. 49/440, 49/441, 475.1, 495.1, 498.1, 502
See application file for complete search history.

(56) References Cited

U.S. PATENT DOCUMENTS

| | | | | |
|---|---|---|---|---|
| 4,561,211 A * | 12/1985 | Raley et al. | ...................... | 49/374 |
| 5,355,628 A * | 10/1994 | Dranchak | ................... | 49/483.1 |
| 5,540,477 A * | 7/1996 | Mori | ....................... | 296/146.15 |
| 5,743,047 A * | 4/1998 | Bonne et al. | ................. | 49/490.1 |
| 5,913,762 A * | 6/1999 | Matsumoto | ....................... | 49/377 |
| 6,010,177 A * | 1/2000 | Fujita et al. | ............. | 296/107.04 |
| 6,250,018 B1 * | 6/2001 | Kawai et al. | ................. | 49/479.1 |
| 6,409,256 B1 * | 6/2002 | Page | ....................... | 296/203.03 |
| 6,612,074 B1 * | 9/2003 | Kaye et al. | ...................... | 49/441 |
| 6,647,666 B2 * | 11/2003 | Kawai et al. | ................. | 49/479.1 |
| 6,679,003 B2 * | 1/2004 | Nozaki et al. | .................. | 49/441 |
| 6,681,526 B2 * | 1/2004 | Mueller et al. | ................... | 49/440 |
| 6,887,472 B2 * | 5/2005 | Morsey et al. | ............ | 424/134.1 |
| 6,935,072 B2 * | 8/2005 | Kogiso et al. | ................ | 49/490.1 |
| 7,293,820 B2 * | 11/2007 | Hashimoto et al. | ........ | 296/146.9 |
| 2001/0025455 A1 * | 10/2001 | Nozaki et al. | ................ | 49/489.1 |

FOREIGN PATENT DOCUMENTS

| | | |
|---|---|---|
| EP | 0 437 974 A2 | 7/1991 |
| EP | 0 659 602 A1 | 6/1995 |
| JP | 8-225020 A | 9/1996 |
| JP | 9-175286 A | 7/1997 |
| JP | 9-226479 A | 9/1997 |
| JP | 10-6381 A | 1/1998 |
| KR | 97-69610 A | 11/1997 |
| KR | 10-2005-0012627 A | 2/2005 |
| KR | 10-2006-0055690 A | 5/2006 |
| KR | 10-0892694 B1 | 4/2009 |

* cited by examiner

*Primary Examiner* — Katherine W Mitchell
*Assistant Examiner* — Justin Rephann
(74) *Attorney, Agent, or Firm* — Morgan, Lewis & Bockius LLP

(57) ABSTRACT

A fixing structure of an opening weather strip for a vehicle may include a door frame molding having a variable cross-sectional width and installed at a front end portion of a door frame, an opening weather strip fixing molding having a cross-sectional height, which varies according to the variable width of the door frame molding and installed at a top end portion of the door frame, and the opening weather strip mounted between the opening weather strip fixing molding and the door frame molding and supported upwards by the opening weather strip fixing molding with a predetermined height to match a vehicle body, thus sealing a space between the vehicle body and the door frame.

9 Claims, 4 Drawing Sheets

A-A cross-section

B-B cross-section

FIXING STRUCTURE OF OPENING WEATHER STRIP FOR VEHICLE

CROSS-REFERENCE TO RELATED APPLICATION

The present application claims priority to Korean Patent Application No. 10-2010-0054010 filed Jun. 8, 2010, the entire contents of which is incorporated herein for all purposes by this reference.

BACKGROUND OF THE INVENTION

1. Field of the Invention

The present disclosure relates to a fixing structure of an opening weather strip for a vehicle. More particularly, it relates to a fixing structure of an opening weather strip for a vehicle, in which an opening weather strip with a uniform cross-section is used at a door, over which a door frame molding with a variable cross-section is installed, to seal a gap between a door frame and a vehicle body.

2. Description of Related Art

Recently, regardless of door type, a shiny door frame molding has been increasingly used to create a more luxurious appearance of a vehicle. Conventionally, while the door frame molding was mainly applied to large and luxury vehicles, it has been widely applied even to midsize family vehicles.

FIGS. 1A and 1B are schematic diagrams showing variable regions of door frame moldings according to door type.

Vehicle doors are typically divided into a panel door (see FIG. 1A) and a frame door (see FIG. 1B). In the case of the panel door, the width of a door frame molding 1 varies over the entire region of the door. On the other hand, in the case of the frame door, the width of a door frame molding 2 is uniform in a region where the door glass is opened and closed and varies in a region where the door glass is fixedly installed to the door frame.

In the case of a panel door type vehicle, a method for applying a door frame molding with a variable width to the entire region of the door to create a more luxurious appearance of the vehicle has been disclosed. In this case, when the width of the door frame molding manufactured by press varies, the shape of the top of the door is formed by bonding two panels also manufactured by press, and thus it is easy to provide a variable cross-section. Moreover, the width of the opening weather strip is uniformly maintained, and thus it is possible to maintain excellent quality.

Meanwhile, in the case of a frame door type vehicle, the door frame is manufactured by roll-bending, and thus the cross-sectional shape is always uniform, which makes it difficult to vary the width of the door frame molding. Accordingly, the cross-section of the opening weather strip assembled to the door frame should have a variable shape, and the opening weather strip with a variable cross-section can be manufactured only by injection molding.

Especially, in the frame door type vehicle, when the door frame molding with a variable shape is applied to the entire door, the opening weather strip assembled between the door frame and vehicle body should be manufactured by injection molding. As such, if most of the opening weather strip is manufactured by injection molding, the opening weather strip is difficult to manufacture, the failure rate is increased, and the manufacturing cost is significantly increased.

FIG. 2 is a cross-sectional view showing a problem occurring when the width of the door frame molding varies in the conventional frame door-type vehicle.

As shown in FIG. 2, in the frame door type vehicle, the shape of a door frame 6 is uniformly maintained even when the cross-section of a door frame molding 2 varies, and thus the position of a sealing portion 4 of an opening weather strip 3 should vary according to the variable width of the door frame molding 2. However, the opening weather strip has a uniform cross-sectional shape (manufactured by extrusion) to maintain excellent quality, and thus the sealing portion 4 cannot match the vehicle body B. Therefore, a gap between the vehicle body B and the door frame 6 is not sealed, which allows dust and rain drops to get into the inside of the vehicle.

Furthermore, when the opening weather strip 3 is formed with a variable shape corresponding to the variable cross-section of the door frame molding 2 such that the sealing portion 4 of the opening weather strip 3 matches the vehicle body B, it is necessary to manufacture the opening weather strip 3 by injection molding, which reduces the quality of the opening weather strip, compared to the products manufactured by extrusion.

As such, in the case of the frame door, it is difficult to apply the door frame molding with a variable cross-section to the entire frame door.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE DISCLOSURE

Various aspects of the present invention are directed to provide a fixing structure of an opening weather strip for a vehicle, in which an opening weather strip fixing molding is installed between an opening weather strip and a door frame and the shape of the opening weather strip fixing molding varies according to a variable width of a door frame molding such that the door frame molding with a variable cross-section can be applied to the entire door and, at the same time, the opening weather strip with a uniform cross-section can be used.

In an aspect of the present invention, the fixing structure of an opening weather strip for a vehicle may include a door frame molding having a variable cross-sectional width and installed at a front end portion of a door frame, an opening weather strip fixing molding having a cross-sectional height, which varies according to the variable width of the door frame molding and installed at a top end portion of the door frame, and the opening weather strip mounted between the opening weather strip fixing molding and the door frame molding and supported upwards by the opening weather strip fixing molding with a predetermined height to match a vehicle body, thus sealing a space between the vehicle body and the door frame.

A fixed portion of the opening weather strip may be inserted between the opening weather strip fixing molding and the door frame molding and coupled thereto.

The opening weather strip fixing molding may include a bracket provided at a top end portion thereof and fixes one side of the fixed portion of the opening weather strip, and the door frame molding may include a fixing protrusion formed to an end portion thereof and is provided at the top end portion of the door frame with a predetermined distance to fix the other side of the fixed portion of the opening weather strip, wherein both sides of the fixed portion of the opening weather strip are fixed by the bracket and the fixing protrusion therebetween and supported upwards on the opening weather strip fixing molding.

The opening weather strip may have a uniform cross-section.

The opening weather strip may include a matching rib having a length greater than a maximum distance between the matching rib and a door-side weather strip, which varies according to the cross-sectional height of the opening weather strip fixing molding, and cut according to the distance between the matching rib and the door-side weather strip to match the door-side weather strip.

The door frame molding may include an outer panel exposed to the outside, and a resin portion provided in the inside of the outer panel and fixed to the front end portion of the door frame, wherein the resin portion fills an empty space between the outer panel and the door frame, which is created as the width of the door frame molding varies.

The resin portion may include a hook which extends for connection to the door frame.

The resin portion may include a fixing protrusion protruding toward the opening weather strip fixing mold, wherein a portion of a fixed portion of the opening weather strip is coupled between the fixing protrusion and the hook of the resin portion.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
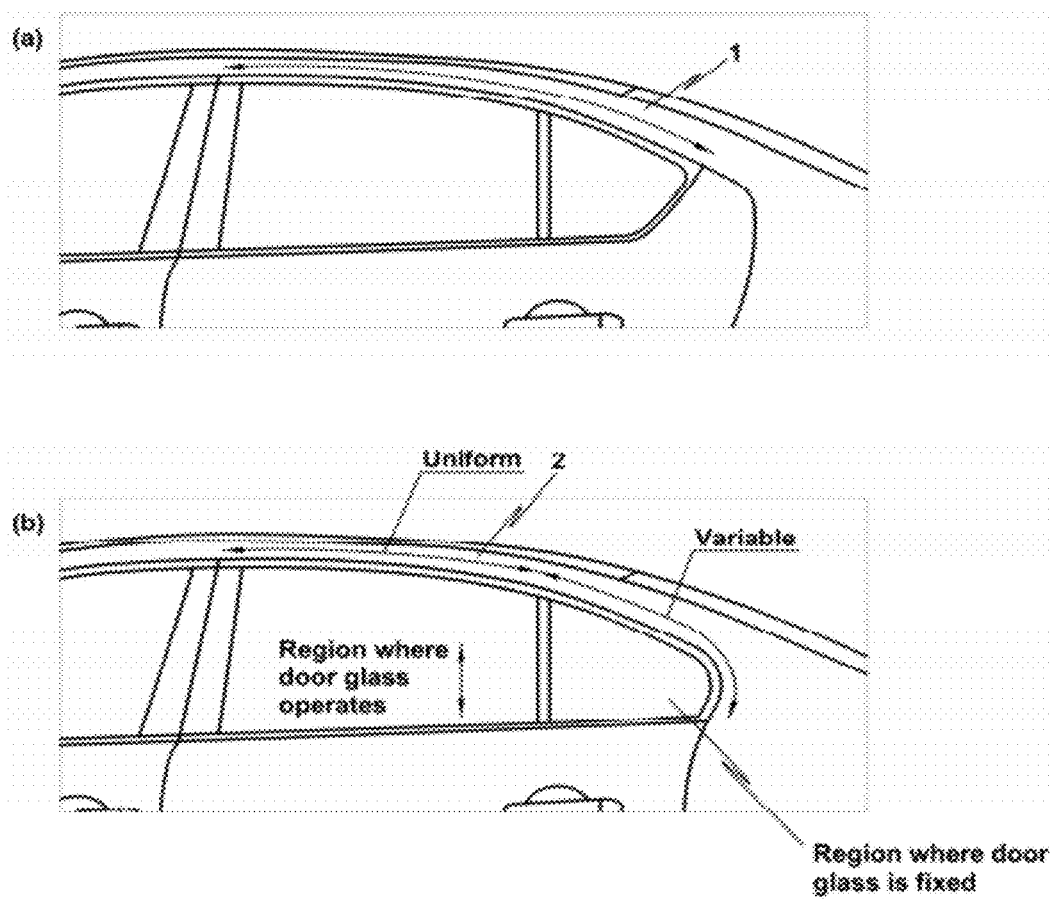
FIGS. 1A and 1B are schematic diagrams showing variable regions of door frame moldings according to door type.
Figure 2:
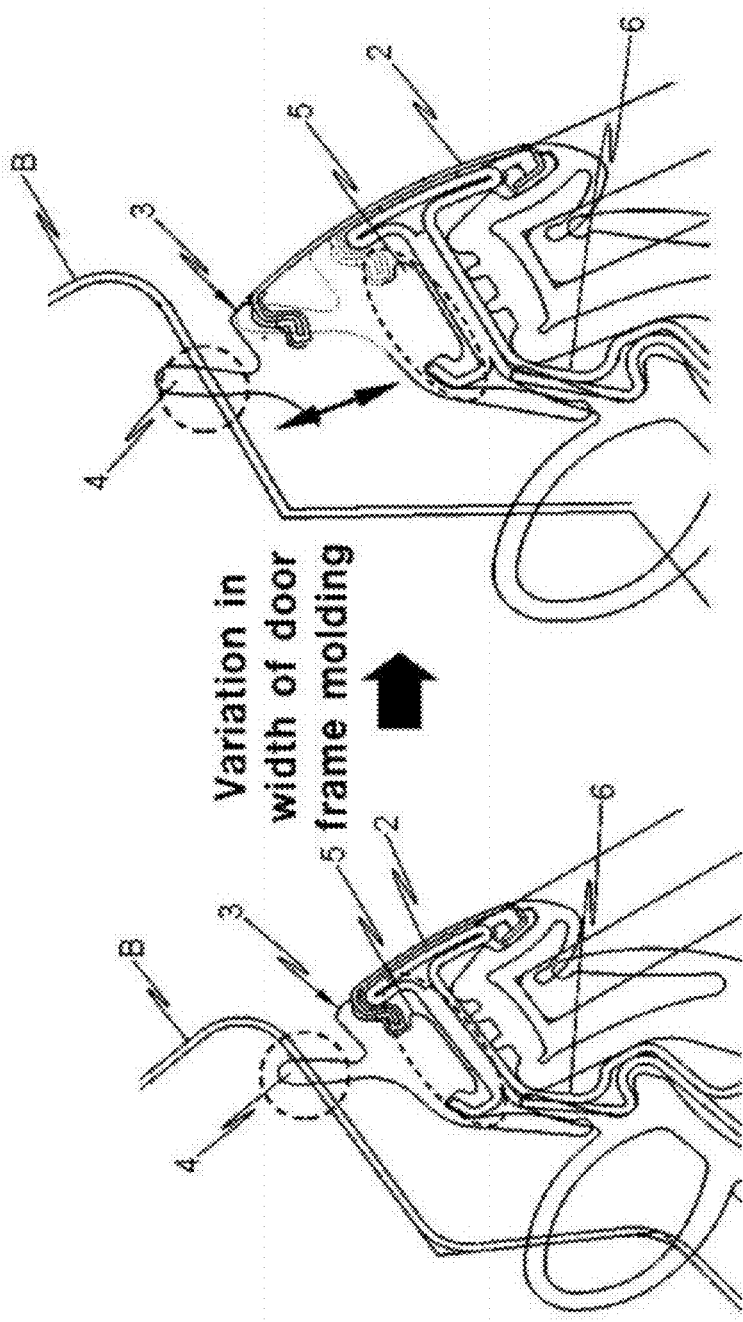
FIG. 2 is a cross-sectional view showing a problem occurring when the width of a door frame molding varies in a conventional frame door-type vehicle.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
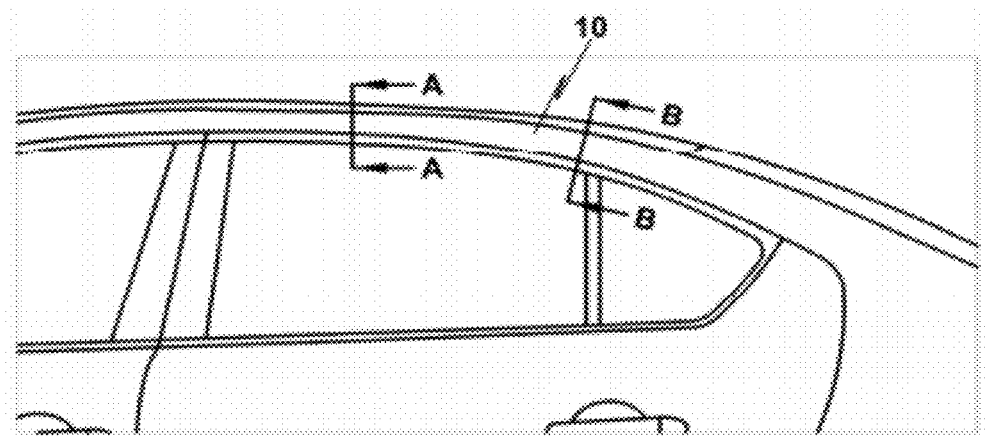
FIG. 3 is a side view showing a side portion of a vehicle, in which the width of a door frame molding varies in a region where door glass moves up and down.

The technical features of the present invention for applying a door frame molding 10 with a variable cross-section to the entire door will be described with reference to FIGS. 4 and 5, which are cross-sectional views taken along lines A-A and B-B of FIG. 3.

Figure 4:
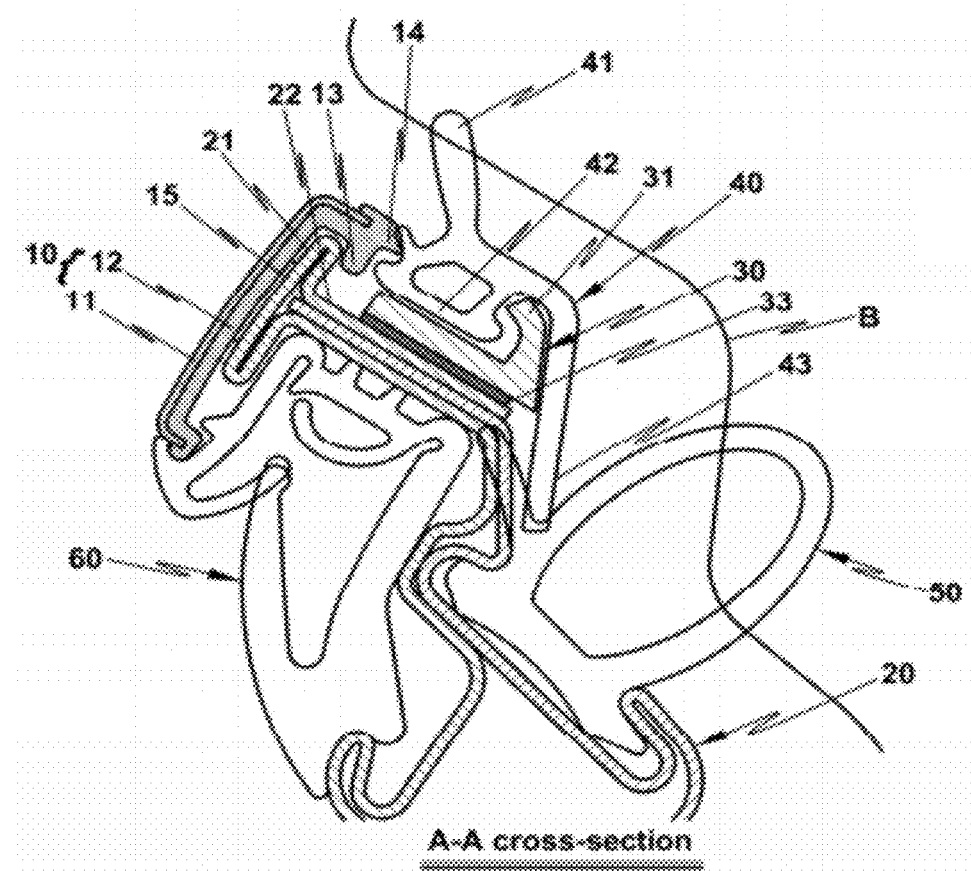
FIG. 4 is a cross-sectional view taken along line A-A of FIG. 3, showing a fixing structure of an opening weather strip for a vehicle in accordance with the present invention.
Figure 5:
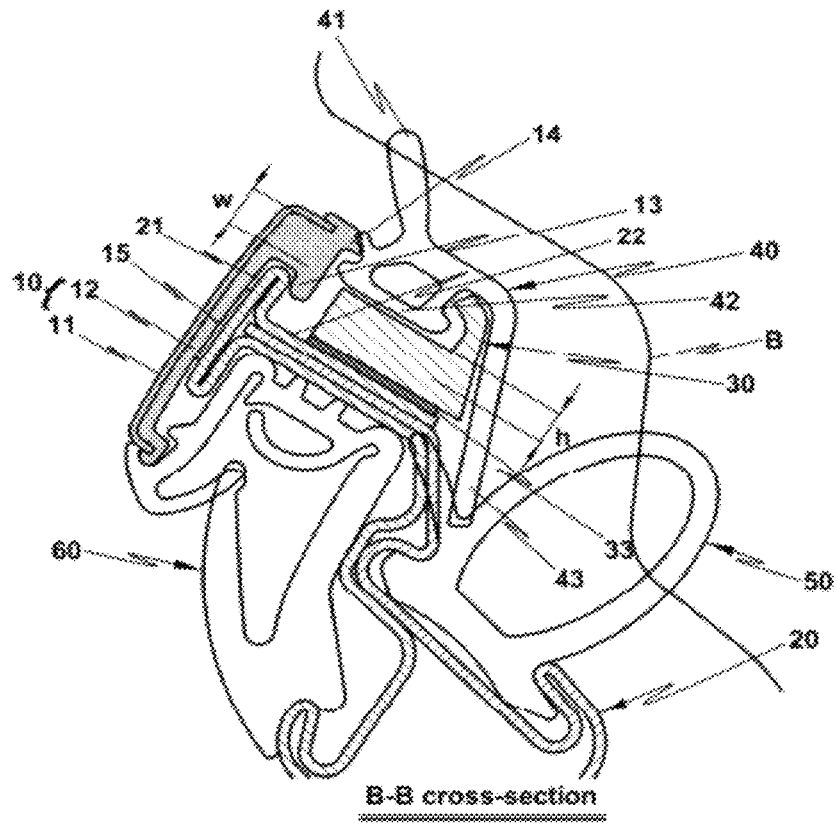
FIG. 5 is a cross-sectional view taken along line B-B of FIG. 3, showing a fixing structure of an opening weather strip for a vehicle in accordance with the present invention.

Moreover, as shown in FIGS. 4 and 5, a door frame molding 10 is assembled to a front end 21 of a door frame 20 (attached using an adhesive member 15 such as double-sided adhesive tape, for example).

The door frame molding 10, whose cross-section exposed from the side of the vehicle varies, includes an outer panel 11 exposed to the outside and a resin portion 12 connected and fixed to the inside of the outer panel 11.

The outer panel 11 is a ⊏-shaped metal layer formed by press and is exposed to the outside to impart gloss. On the other hand, the resin portion 12 is installed at the front end 21 of the door frame 20 and includes a hook 13 for connection to the door frame 20.

The resin portion 12 is formed to have a substantially ⊏-shaped cross-section and, as shown in FIG. 4, the hook 13 is bent at the top end of the resin portion 12. The resin portion 12 is hooked and connected to one side of the front end 21 of the door frame 20 by the hook 13 and, at the same time, attached to the front surface of the door frame 20 by an adhesive member 15. That is, the resin portion 12 is connected to the front end 21 of the door frame 20 in such a manner that the one side of the front end 21 of the door frame 20 is inserted into the inside of the hook 13.

The resin portion 12 further includes a fixing protrusion 14 for fixing a fixed portion 42 of the opening weather strip 40 inserted between the door frame molding 10 and an opening weather strip fixing molding 30 such that the fixed portion 42 of the opening weather strip 40 is not separated, and the fixing protrusion 14 is formed to extend from the top of the hook 13.

The resin portion 12 serves to fill an empty space between the outer panel 11 and the door frame 20, which is created by the variable width of the door frame molding 10, thus improving the stiffness.

As shown in FIG. 5, regardless of the variable width of the door frame molding 10 (even though the width of the door frame molding 10 is increased as it goes toward the rear of the vehicle), the hook 13 has a substantially ⊏-shape together with the top end of the resin portion 12 and always maintains the same position so as to be hooked by the one side of the front end 21 of the door frame 20.

The bottom of the resin portion 12 is bent and inserted into one side of a glass run 60.

Meanwhile, in the present invention, the opening weather strip fixing molding 30 is provided at a top end 22 of the door frame 20 such that the opening weather strip 40 provided at the top end 22 of the door frame 20 is configured to have a uniform cross-sectional shape.

The cross-sectional height of the opening weather strip fixing molding 30 varies according to the variable width of the door frame molding 10.

That is, the opening weather strip fixing molding 30 has a height which varies according to the variable width of the door frame molding 10. Thus, as shown in FIGS. 4 and 5, the opening weather strip fixing molding 30 has a variable height (h) corresponding to the variable width (w) of the door frame molding 10, which is changed (or increased) as it goes toward the rear of the vehicle. Here, the variable width (w) has the same value as the variable height (h).

Figure 6:
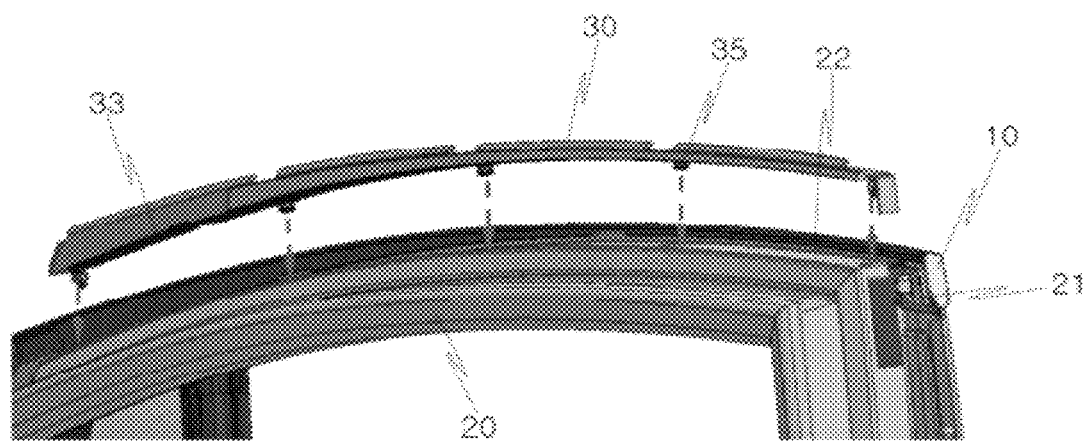
FIG. 6 is a partially exploded perspective view showing a fixing structure of an opening weather strip for a vehicle in accordance with the present invention.

As shown in FIG. 6, the opening weather strip fixing molding 30 is fixed to the door frame 20 using a coupling member 35 such as a clip and an adhesive member 33 such as double-sided adhesive tape.

For example, the opening weather strip fixing molding 30 having double-sided adhesive tape attached to the bottom is bonded to the top end 22 of the door frame 20 and is assembled and fixed by a clip which penetrates the opening weather strip fixing molding 30 and the top end 22 of the door frame 20.

The opening weather strip fixing molding 30 may be manufactured by injection molding using a resin material.

The opening weather strip 40 is inserted into a space between the door frame molding 10 and the opening weather strip fixing molding 30, which is created when the opening weather strip fixing molding 30 is installed at the top end 22 of the door frame 20.

In order to install the opening weather strip 40, a bracket 31 for fixing one side of the fixed portion 42 of the opening weather strip 40 is provided at the top right of the opening weather strip fixing molding 30 and a fixing protrusion 14 for fixing the other side of the fixed portion 42 of the opening weather strip 40 is provided at the top end of the door frame molding 10 such that both sides of the fixed portion 42 of the opening weather strip 40 inserted between the top end of the opening weather strip fixing molding 30 and the top end of the door frame molding 10 are fixed by the bracket 31 and the fixing protrusion 14.

In an exemplary embodiment of the present invention, as the position of the fixing protrusion 14 varies due to the variable width of the door frame molding 10, the cross-sectional height of the opening weather strip fixing molding 30 varies, and thus the bracket 31 is located at the same height as the fixing protrusion 14. Therefore, it is possible to uniformly maintain the structure for fixing the opening weather strip 40 between the door frame molding 10 and the opening weather strip fixing molding 30.

Here, the top end of the fixing protrusion 14 has a curved shape and the top end of the bracket 31 has an inclined surface such that the opening weather strip 40 can be easily inserted therebetween.

Meanwhile, in the present invention, the opening weather strip 40 manufactured by extrusion has a uniform cross-section, and the shapes of the portions such as a sealing portion 41 and the fixed portion 42 of the opening weather strip 40, which are in direct contact with the vehicle body B, except for a matching rib 43, are not changed regardless of the variable width of the door frame molding 10. However, as the cross-sectional height of the opening weather strip fixing molding 30 varies, the distance between the matching rib 43 and a door-side weather strip 50 (the distance to a portion matching the door-side weather strip 50) also varies, and thus the length of the matching rib 43 is set long enough to be in contact with the door-side weather strip 50.

That is, in the present invention, the matching rib 43 does not have a length corresponding to the variable width of the door frame molding 10, but is formed with a sufficient length by extrusion and cut according to the distance between the matching rib 43 and the door-side weather strip 50 according to its position, thus matching the door-side weather strip 50.

In other words, taking into consideration of the maximum distance between the matching rib 43 and the door-side weather strip 50, which varies according to the cross-sectional height of the opening weather strip fixing molding 30, the matching rib 43 is formed into a length grater than the maximum distance and cut according to the distance between the matching rib 43 and the door-side weather strip 50 according to its position, thus matching the door-side weather strip 50.

As such, the fixing structure of the vehicle opening weather strip in accordance with the present invention is configured such that the door frame molding 10 with a variable cross-section, not the conventional door frame molding with a uniform cross-section, is applied to the region where the door glass of the frame door is opened and closed, and thus the door frame molding 10 with a variable cross-section can be applied to the entire door.

Moreover, the opening weather strip fixing molding 30, which varies according to the variable cross-sectional shape of the door frame molding 10, is installed between the opening weather strip 40 and the top end 22 of the door frame 20, which makes it possible to use the opening weather strip 40 having a uniform cross-section and manufactured by extrusion, and thus it is possible to maintain the excellent quality of the opening weather strip 40 compared to the opening weather strips manufactured by injection molding.

The opening weather strip 40 seals the gap between the door frame 20 and the vehicle body B to block noise from the outside and to prevent impurities such as dust and rain drops from getting into the inside of the vehicle.

As described above, according to the fixing structure of the opening weather strip in accordance with the present invention, the position of the fixed portion of the opening weather strip varies according to the variable position of the sealing portion of the opening weather strip through the application of the opening weather strip fixing molding, and thus the door frame molding with a variable cross-section can be applied to the entire door, thereby creating a more luxurious appearance of a vehicle.

Therefore, according to the fixing structure of the opening weather strip in accordance with the present invention, it is possible to use the opening weather strip with a uniform cross-section manufactured by extrusion, and thus it is possible to provide excellent quality of the opening weather strip, compared to the opening weather strips manufactured by injection molding.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fixing structure of an opening weather strip for a vehicle, the fixing structure comprising:
   a door frame molding having a variable cross-sectional width and installed at a front end portion of a door frame;
   an opening weather strip fixing molding having a cross-sectional height, which varies according to the variable width of the door frame molding and installed at a top end portion of the door frame; and
   the opening weather strip mounted between the opening weather strip fixing molding and the door frame molding, wherein the opening weather strip covers the opening weather strip fixing molding with a predetermined height to interface with a vehicle body, thus sealing a space between the vehicle body and the door frame;
   wherein the opening weather strip comprises a matching rib having a length greater than a distance between an upper portion of the opening weather strip fixing molding and a portion of a door-side weather strip to which the matching rib is in contact;
   wherein the upper portion of the opening weather strip fixing molding is a top portion of the opening weather strip fixing molding to which the matching rib is in contact,
   wherein the distance varies according to the cross-sectional height of the opening weather strip fixing molding, and
   wherein the matching rib is manufactured at first to have a length larger than the distance and then is cut to match the door-side weather strip.

2. The fixing structure of claim 1, wherein a fixed portion of the opening weather strip is inserted between the opening weather strip fixing molding and the door frame molding and coupled thereto.

3. The fixing structure of claim 2, wherein:
   the opening weather strip fixing molding includes a bracket provided at a top end portion thereof and fixes one side of the fixed portion of the opening weather strip; and
   the door frame molding includes a fixing protrusion formed to an end portion thereof and is provided at the top end portion of the door frame with a predetermined distance to fix the other side of the fixed portion of the opening weather strip,
   wherein both sides of the fixed portion of the opening weather strip are fixed by the bracket and the fixing protrusion therebetween and a bottom surface of the fixed portion is placed on the opening weather strip fixing molding.

4. The fixing structure of claim 1, wherein the opening weather strip has a uniform cross-section.

5. The fixing structure of claim 1, wherein the door frame molding comprises:
   an outer panel exposed to the outside; and
   a resin portion provided in the inside of the outer panel and fixed to the front end portion of the door frame,
   wherein the resin portion fills an empty space between the outer panel and the door frame, which is created as the width of the door frame molding varies.

6. The fixing structure of claim 5, wherein the resin portion comprises a hook which extends for connection to the door frame.

7. The fixing structure of claim 4, wherein the resin portion comprises a fixing protrusion protruding toward the opening weather strip fixing mold.

8. The fixing structure of claim 5, wherein the resin portion comprises a fixing protrusion protruding toward the opening weather strip.

9. A fixing structure of an opening weather strip for a vehicle, the fixing structure comprising:
   a door frame molding having a variable cross-sectional width and installed at a front end portion of a door frame;
   an opening weather strip fixing molding having a cross-sectional height, which varies according to the variable width of the door frame molding and installed at a top end portion of the door frame; and
   the opening weather strip mounted between the opening weather strip fixing molding and the door frame molding, wherein the opening weather strip covers the opening weather strip fixing molding with a predetermined height to interface with a vehicle body, thus sealing a space between the vehicle body and the door frame;
   wherein the door frame molding comprises:
      an outer panel exposed to the outside; and
      a resin portion provided in the inside of the outer panel and fixed to the front end portion of the door frame,
      wherein the resin portion fills an empty space between the outer panel and the door frame, wherein the empty space is created as the width of the door frame molding varies;
   wherein the resin portion comprises a hook which extends for connection to the door frame;
   wherein the resin portion comprises a fixing protrusion protruding toward the opening weather strip fixing molding; and
   wherein a portion of a fixed portion of the opening weather strip is coupled between the fixing protrusion and the hook of the resin portion.

* * * * *